United States Patent
Lester et al.

(10) Patent No.: US 7,405,361 B1
(45) Date of Patent: Jul. 29, 2008

(54) NESTED INSULATING TUBE ASSEMBLY FOR A COIL LEAD

(75) Inventors: Michael E. Lester, Burton, OH (US); Steve Schmitt, Huntsburg, OH (US)

(73) Assignee: Electrolock, Inc., Hiram, OH (US)

( * ) Notice: Subject to any disclaimer, the term of this patent is extended or adjusted under 35 U.S.C. 154(b) by 0 days.

(21) Appl. No.: 10/368,855

(22) Filed: Feb. 19, 2003

Related U.S. Application Data

(60) Provisional application No. 60/359,789, filed on Feb. 26, 2002.

(51) Int. Cl.
*H01B 7/00* (2006.01)

(52) U.S. Cl. .................. 174/138 E; 174/135; 174/167; 174/138 G

(58) Field of Classification Search ............. 174/138 E, 174/135, 167, 138 G
See application file for complete search history.

(56) References Cited

U.S. PATENT DOCUMENTS

| | | | |
|---|---|---|---|
| 3,619,381 A | * | 11/1971 | Fitterer .................... 205/783.5 |
| 3,801,392 A | | 4/1974 | Scheel et al. |
| 4,034,153 A | | 7/1977 | Andres et al. |
| 4,456,651 A | | 6/1984 | Pollmeier et al. |
| 4,505,977 A | | 3/1985 | Hasenauer et al. |
| 4,601,931 A | | 7/1986 | Doyle et al. |
| 5,079,077 A | | 1/1992 | Sakayanagi et al. |
| 5,172,085 A | * | 12/1992 | Glenat et al. ................ 333/222 |
| 5,973,269 A | | 10/1999 | Draper et al. |
| 5,989,702 A | | 11/1999 | Draper et al. |
| 6,288,341 B1 | | 9/2001 | Tsunoda et al. |
| 6,656,317 B2 | | 12/2003 | Hudson |
| 2004/0256145 A1 | | 12/2004 | Hudson |

OTHER PUBLICATIONS

DuPont, "NOMEX® brand paper", published prior to Feb. 26, 2002, pp. 54-59.

* cited by examiner

*Primary Examiner*—Jinhee J. Lee
(74) *Attorney, Agent, or Firm*—Pearne & Gordon LLP

(57) ABSTRACT

A multiple spiral tube assembly having a plurality of nested tubes, each of a different size and made of an insulating material. One tube is inserted within another tube to form a flexible, multiple-layer tube assembly. The tubular assembly is slipped over an electrical conductor to form a flexible, multi-layer, thick wall construction for coil lead insulation.

4 Claims, 2 Drawing Sheets

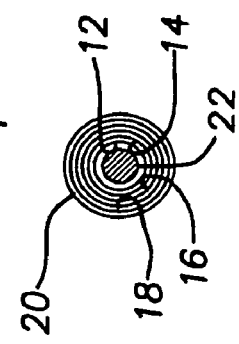
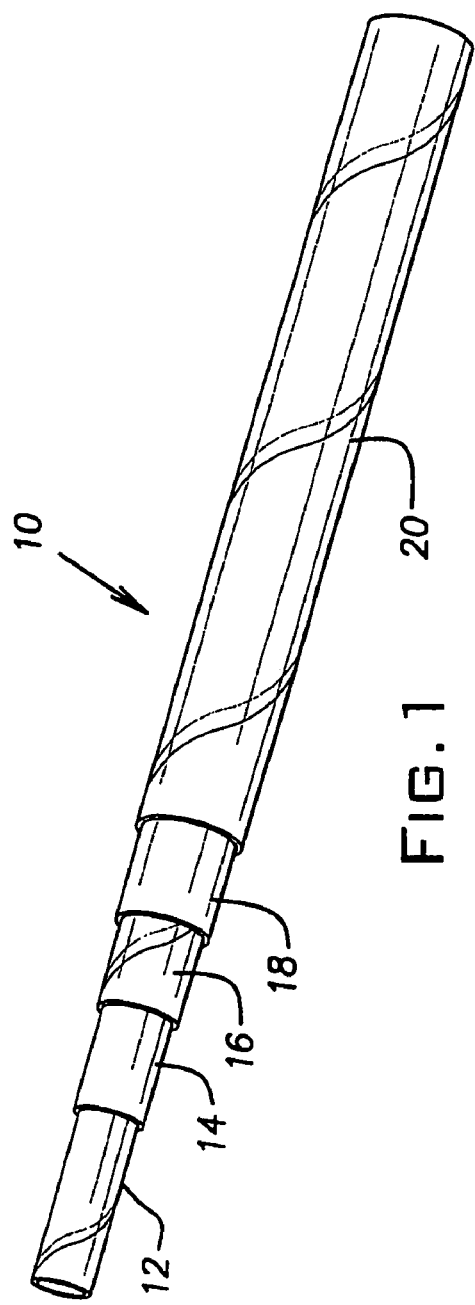
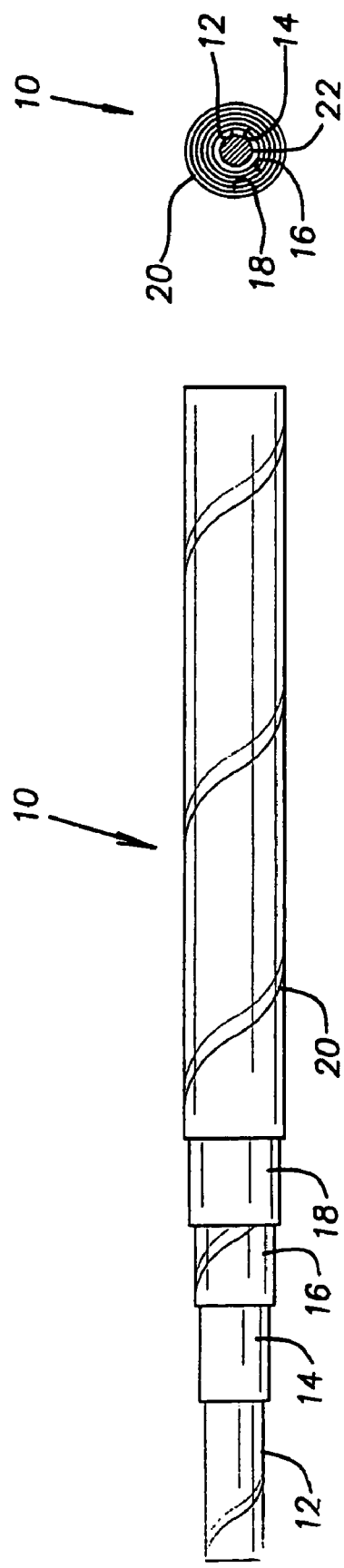

NESTED INSULATING TUBE ASSEMBLY FOR A COIL LEAD

FIELD OF INVENTION

The present invention relates to tubular electrical insulation and, more particularly, to tubular insulating structures that are slipped over electrical conductors.

BACKGROUND OF THE INVENTION

The windings of electric motors and generators typically have jumper leads that connect the individual coil groups that comprise the windings. These leads must be electrically insulated, especially in high voltage applications, such as between 2300 and 6900 volts, where arcing can occur.

To provide such electrical insulation, it is known to hand wind several layers of an insulating tape around the jumpers. This insulating tape can be constructed of a paper material containing mica.

The hand-winding of mica tape results in multiple layers of insulative material having sufficient dielectric and corona resistance properties, while retaining adequate flexibility. Further, it is known to impregnate the hand-wrapped mica tape with an epoxy resin.

The process of winding mica tape and other insulating materials around the jumper leads of electrical winding is labor intensive. Further, hand taping may lead to repetitive work injuries.

The coil leads of lower voltage motors are sometimes covered with sleeves of a single layer insulative material. However, a single layer of mica paper or similar insulation does not provide sufficient insulation for higher voltage applications without making the layer too thick to provide adequate flexibility.

It is also known to cover the leads of high voltage coils with sleeves constructed of fiberglass coated with silicone or acrylic, allowing for increased flexibility. However, since the voltage endurance of such materials is generally inferior to that of mica tape, these fiberglass sleeves must be used throughout the entire coil, rather than just around the leads extending therefrom.

BRIEF SUMMARY OF THE INVENTION

The present invention provides a nested insulating tube assembly for insulating an electrical conductor. The assembly comprises a first electrically insulative tube and a second electrically insulative tube positioned within the first tube.

BRIEF DESCRIPTION OF THE DRAWINGS

FIG. 1 is a perspective view of a multiple tube assembly according to an embodiment of the present invention;

FIG. 2 is a side view of the multiple tube assembly of FIG. 1;

FIG. 3 is an end view of the multiple tube assembly of FIG. 1; and

DETAILED DESCRIPTION OF THE INVENTION

Figure 4:
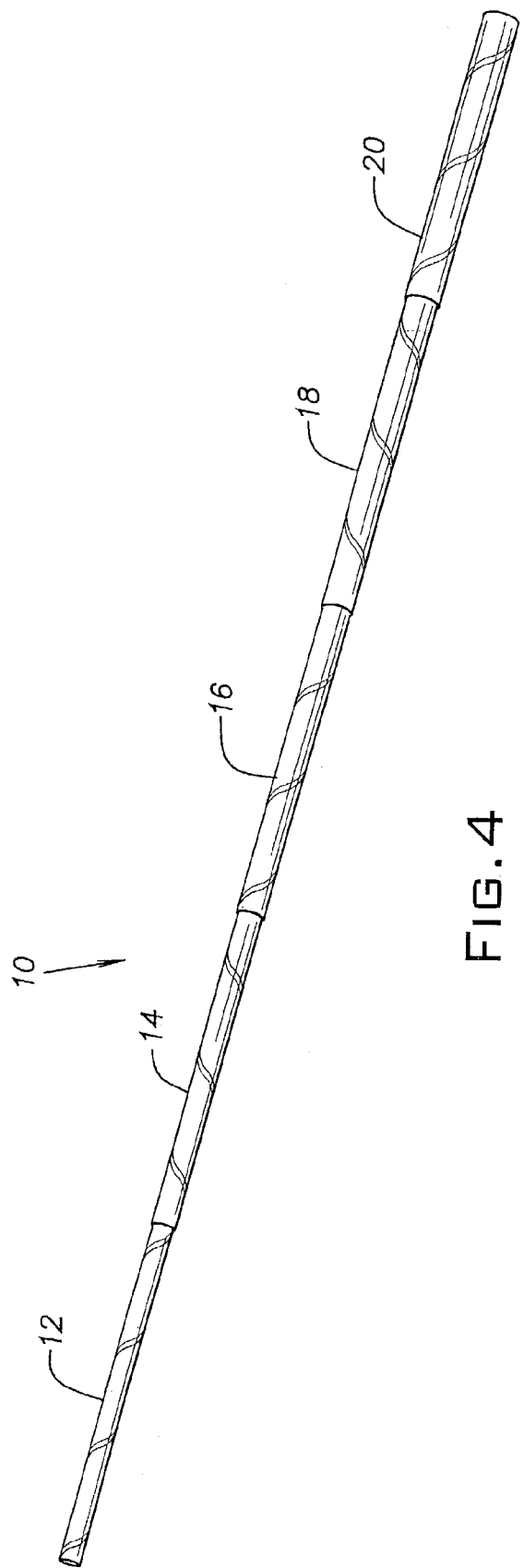
FIG. 4 is an elevational view of the multiple tube assembly of FIG. 1 with the individual tubes extended for illustrative purposes.

Referring now to the drawings, in FIGS. 1-4 there is illustrated a nested insulating tube assembly 10 according to the present invention. The tube assembly 10 includes a plurality of individual tubes 12, 14, 16, 18, 20, each of successively larger size being assembled in a nested fashion. The term "nested" as used herein refers to the relative positions of the tubes 12-20 being arranged successively, one tube inside another, from largest to smallest thickness.

The term "thickness" as used herein with respect to the tubes 12-20 refers to a measurement of the overall cross-sectional size of a tube such that it can be compared to the overall cross-sectional size of another tube. For example, the thickness of a cylindrical tube, thus having a circular cross-section, can be expressed in terms of inside or outside diameter, radius, or circumference. However, non-cylindrical tubes may be used according to the present invention, in which case thickness relates to an appropriate measurement of the overall cross-sectional size of each tube.

Each tube 12-20 of the tube assembly 10 is constructed of an electrically insulative mica paper material that has been wound around an appropriately sized cylindrical form or mandrel (not shown). An example of a suitable mica paper is commercially available under the trade name NOMEX M. Specifically, NOMEX M brand aramid and mica paper is a flame-resistant, high-temperature and corona-resistant synthetic paper produced from a blend of platelet mica and aramid floc and fibrids.

Each tube 12-20 is constructed by winding a continuous mica paper sheet in a spiral fashion about the mandrel until the desired thickness is reached. Alternatively, a series of mica papers can be substituted for the continuous mica paper sheet. A suitable binder or glue is applied to hold the wound layers of paper together and form a unitary, spiral wound tube. Each tube 12-20 is removed from the mandrel after it has been wound and glued, resulting in a self-supporting tubular structure. The term "self-supporting" refers to a property of the tubes 12-20 that allows the tubes 12-20 to retain their tubular shape absent a supporting form or other sub-structure, for example, the mandrel used in forming the tubes 12-20, other tubes 12-20, or an electrical conductor around which the tubes 12-20 are placed.

The mica paper may be impregnated with an epoxy resin or other insulating or binding material, as necessary to meet the needs of the specific application of the resulting tube assembly. Further, as an alternative to spiral winding, the tubes 12-20 can be made by other known methods of forming paper tubes.

As shown, each tube 12-20 is sized to fit inside of the cavity formed by a larger, adjacent tube. The tubes 12-20 are inserted, one inside the other, to form the tube assembly 10. In use, the tube assembly 10 is slipped over a coil lead 22.

In the present embodiment, the size of each tube is selected to loosely fit around the next smallest. For example, the largest tube 20 has an inside diameter slightly larger than the outside diameter of the adjacent tube 18, such that the largest tube 20 fits loosely around the adjacent tube 18. The resulting interstices may be filled with a resin or other appropriate material.

In FIGS. 1 and 2, the tube assembly 10 is shown having the tubes 12-20 extending from within each other for purposes of illustration. In tube assembly 10 of the present embodiment, each of the tubes 12-20 is substantially the same length. The length of the tube assembly 10, being substantially the same as each of the constituent tubes 12-20, is sized to suit the particular application or provided in a predetermined stock lengths, such as in 12-inch lengths, which can be cut to suit different applications as needed.

Further, the present embodiment includes five nested tubes 12-20. However, it should be appreciated that any number of tubes can be used according to the present invention as necessary to serve a particular application. Further, other materials can be used to form the tubes 12-20 of the present invention, such as polytetrafluoroethylene (PTFE), silicon or acrylic coated fiberglass, or other known suitable insulating materials.

The tube assembly 10 according to the present invention provides flexible, multiple-layer, thick-wall insulation which can be applied to a lead as a single piece. The tube assembly 10 replaces the hand taping of a lead using mica tape while maintaining adequate flexibility. When the tube assembly 10 is bent or flexed, each of the tubes 12-20 is capable of longitudinal translation or other movement relative to the other tubes 12-20. Thus, a tube assembly 10 effectively having a thicker wall is provided that retains much of the inherent flexibility of the individual thinner walls of the tubes 12-20 of which the assembly 10 is comprised.

Further, the nested insulating tube assembly may be used in other insulation applications such as for replacing silicon or acrylic coated fiberglass sleeving.

While the invention has been shown and described with reference to a specific embodiment, various changes may be made and equivalents may be substituted for elements thereof by those skilled in the art without departing from the scope of the invention. In addition, other modifications may be made to adapt a particular situation or material to the teachings of the invention without departing from the essential scope thereof. Accordingly, the invention is not to be limited in scope and effect to the specific embodiment herein described, nor in any other way that is inconsistent with the extent to which the progress in the art has been advanced by the invention, except insofar as indicated in the appended claims.

What is claimed is:

1. An insulating tube assembly for insulating an electrical conductor of a motor or a generator, comprising:

a first insulating tube that includes a spirally wound insulating material, wherein the spirally wound insulating material is bound together to form a first self-supporting tube that independently retains its tubular shape after binding, and wherein the first insulating tube has a first diameter;

a second insulating tube that includes said or another spirally wound insulating material, wherein said or another spirally wound insulating material is bound together to form a second self-supporting tube that independently retains its tubular shape after binding, and wherein the second insulating tube has a second diameter that is smaller than the first diameter; and a third insulating tube that includes said or another spirally wound insulating material, wherein said or another spirally wound insulating material is bound together to form a third self-supporting tube that independently retains its tubular shape after binding, and wherein the third insulating tube has a third diameter that is smaller than the second diameter, wherein the second diameter is sized such that the second insulating tube is capable of coaxially nesting within the first insulating tube such that a first interstice is formed between the first and second insulating tubes, and wherein the third diameter is sized such that the third insulating tube is capable of coaxially nesting within the second insulating tube such that a second interstice is formed between the second and third insulating tubes, and further wherein each of the first, second, and third insulating tubes is self-supporting so as to independently retain its respective tubular shape prior to being coaxially nested with any other of the first, second, and third insulating tubes.

2. The insulating tube assembly of claim 1 wherein each of the first, second, and third insulating tubes is capable of movement relative to any other of the first, second, and third insulating tubes when the insulating tubes are coaxially nested.

3. The insulating tube assembly of claim 2 wherein each of the first, second, and third insulating tubes is capable of longitudinal translation relative to any other of the first, second, and third insulating tubes when the insulating tubes are coaxially nested.

4. The insulating tube assembly of claim 1, wherein the first, second, and third insulating tubes are coaxially nested and the first and second interstices filled with a resin.

* * * * *